United States Patent [19]

Ishiwata et al.

[11] Patent Number: 4,931,927
[45] Date of Patent: Jun. 5, 1990

[54] METHOD OF CONSTRUCTING AND RECORDING LIST OF RECORDED DATA IN POSTSCRIPT TYPE OPTICAL DISK

[75] Inventors: Koji Ishiwata; Satoru Tobita, both of Kanagawa, Japan

[73] Assignee: Sony Corporation, Tokyo, Japan

[21] Appl. No.: 934,631

[22] PCT Filed: Mar. 28, 1986

[86] PCT No.: PCT/JP86/00152
§ 371 Date: Jan. 21, 1987
§ 102(e) Date: Jan. 21, 1987

[87] PCT Pub. No.: WO86/05916
PCT Pub. Date: Oct. 9, 1986

[30] Foreign Application Priority Data

Mar. 29, 1985 [JP] Japan ................... 60-65956

[51] Int. Cl.$^5$ ............... G06F 3/08; G06F 12/00; G11B 27/00; G11B 27/10
[52] U.S. Cl. ................................. 364/300
[58] Field of Search ... 364/200 MS File, 900 MS File, 364/300, 713, 822; 369/32, 44, 59, 100, 109, 111

[56] References Cited

U.S. PATENT DOCUMENTS

| | | | |
|---|---|---|---|
| 4,545,044 | 10/1985 | Satoh et al. | 369/32 |
| 4,587,643 | 5/1986 | Monen et al. | 369/32 |
| 4,682,317 | 7/1987 | Tamisawa | 369/52 |
| 4,682,318 | 7/1987 | Busby | 369/59 |

FOREIGN PATENT DOCUMENTS

| | | |
|---|---|---|
| 59-68876 | 4/1984 | Japan . |
| 59-79471 | 8/1984 | Japan . |
| 60-50760 | 3/1985 | Japan . |
| 60-246078 | 5/1985 | Japan . |
| 2151373 | 7/1985 | United Kingdom . |
| 2101356 | 5/1987 | United Kingdom . |

OTHER PUBLICATIONS

An Audio Engineering Society Preprint presented at 72nd Convention of Oct. 23-27, 1982, No. 1898 (E-6).

*Primary Examiner*—David Y. Eng
*Assistant Examiner*—Robert B. Harrell
*Attorney, Agent, or Firm*—Hill, Van Santen, Steadman & Simpson

[57] ABSTRACT

In constructing a list of recorded data recorded onto a disk (4), a point of starting the recording of finally recorded data is found from time record data of the final record, and the preceding data area is sought to find a point of starting the recording of the data. The seeking operation is repeated to construct the list within short periods of time on a time table under a system controller (1). The list thus prepared is then recorded onto a list-recording area of the disk (4).

1 Claim, 9 Drawing Sheets

FIG. 5

| MN | POINT OF STARTING THE RECORDING |
|---|---|
| 1 | Ttoc(1) |
| 2 | Ttoc(2) |
| 3 | Ttoc(3) |
| 4 | Ttoc(4) |
| 5 | — |
| 98 | — |
| 99 | — |
| Tend | Tlast |
| MNs | 1 |
| MNI | 4 |

FIG. 6

| | |
|---|---|
| MN = 1 | Ttoc(1) |
| MN = 1 | Ttoc(1) |
| MN = 1 | Ttoc(1) |
| MN = 2 | Ttoc(2) |
| MN = 2 | Ttoc(2) |
| MN = 2 | Ttoc(2) |
| MN = 3 | Ttoc(3) |
| MN = 3 | Ttoc(3) |
| MN = 3 | Ttoc(3) |
| MN = 4 | Ttoc(4) |
| MN = 4 | Ttoc(4) |
| MN = 4 | Ttoc(4) |
| MNs | 1 |
| MNs | 1 |
| MNs | 1 |
| MNI | 4 |
| MNI | 4 |
| MNI | 4 |
| Tend | Tlast |
| Tend | Tlast |
| Tend | Tlast |

REPEAT IN THE FOLLOWING

METHOD OF CONSTRUCTING AND RECORDING LIST OF RECORDED DATA IN POSTSCRIPT TYPE OPTICAL DISK

BACKGROUND OF THE INVENTION

This invention relates to a method of constructing a list of recorded data in a postscript type optical disk using an optical recording medium and, more particularly, to a method of constructing and recording a list of recorded data in a non-erasable postscript type optical disk within short periods of time.

In a usual optical disk, on which a train of signals are recorded between its inner and outer peripheries by utilizing a laser beam, a list of recorded data is recorded onto the disk. This list of recorded data is called TOC (table of contents), and it provides information about positions of recorded data in the signal train. The position of intended data can be accessed at high speed with reference to the list noted above at the time of the data accessing.

The position of recorded data may be expressed using addresses of frame numbers or the like for each track as in a video disk player where a disk driven at a constant angular velocity (C.A.V.) to reproduce data with an optical pick-up, or it may be expressed using the overall recording time from a point of starting the recording. In the case of a disk (hereinafter referred to it as CD) with digital audio signals recorded thereon, which is called as compact disk known as an example of the latter and driven at a constant linear velocity (C.L.V.) to reproduce data with an optical pick-up, the overall recording time is used as the record position information, and the time point of start of each musical piece, the number of first musical piece, the number of the last musical piece and the last time point of recording are recorded onto list areas on the disk. In an optical disk capable of recording, the status of record of data presently recorded onto the disk, is usually recorded onto a list area, and this list is used for random accessing to data.

When it is intended to record a list onto a non-erasable postscript type optical disk with the same format as for the CD noted above, there is an inconvenience in case the length of recorded data, number of data pieces, etc. are not known until the end of recording of the last data. In this case, the list can not be recorded onto the disk unless all the data have been recorded. In practice, however, it is necessary to access data already recorded onto the disk at high speed even before the end of recording of all the data. Where no list is recorded onto the disk, the same information as the list can be obtained through continuous reading of the data recorded onto the disk. However, the real-time reading of the recorded data from the point of start till the point of end of the recording requires long time.

In the postscript type optical disk, particularly the non-erasable disk, it is impossible to record a list onto the list area of the disk unless all the data have been recorded. Therefore, it has been impossible to access the recorded data at high speed until the end of recording of all the data.

The present invention has been intended in order to solve the above problems in the prior art, and its object is to provide a method of constructing and recording a list of recorded data in a postscript type optical disk, particularly of non-erasable type, with which it is possible to construct list information of recorded data under control within short periods of time even though no list of recorded data is recorded so that recorded data may be accessed at high speed.

The method of constructing a list according to the present invention features the steps of detecting a point of ending the recording of recorded data recorded onto a disk, reading time code data at said point of ending the recording, obtaining a point of starting the recording through substraction of the recording time of the last recorded data from the overall recording time according to said time code data, and storing the obtained point of starting the recording in a time table of the pertinent data number, thereby obtaining a list of recorded data.

The method of recording a list according to the present invention features the steps of detecting a point of ending the recording of recorded data recorded onto a disk, reading time code data at said point of ending the recording, obtaining a point of starting the recording through subtraction of the recording time of the last recording data from the overall recording time according to said time code data, storing the obtained point of starting the recording in a time table of the pertinent data number, initializing a pointer representing a data number to be retrieved next with the data number of said last recording data, reading out the point of starting the recording of recorded data of the data number represented by the pointer from said time table, storing a point for seeking a value with a predetermined off-set from the read-out point of starting the recording in a register, seeking the point of the value in said register by advancing said pointer, effecting compensation for the seek point when the data number after the seeking fails to coincide with the pointer while obtaining the point of starting the recording of the pertinent data and storing it in said time table when the data number coincides with the pointer, and repeating the seeking operation to obtain the point of starting the recording of each data, thereby constructing a list of recorded data and recording it onto a list area of the postscript type optical disk.

According to the present invention, the point of recording of the last data is detected, and the point of starting the recording of the last recorded data is obtained from the pertinent time code data. On the basis of the data of the recording start point the preceding data area is sought to find the point of starting the recording of that data. This process is repeatedly done progressively. In this way, a list of all recorded data recorded onto the disk is constructed at high speed under control of a system controller. The list thus constructed is recorded onto a list area of the postscript type optical disk.

BRIEF DESCRIPTION OF THE DRAWINGS

FIG. 5 is a view showing a time table in the system controller;

FIG. 6 is a view showing the form of a list recorded onto a disk;

DESCRIPTION OF THE PREFERRED EMBODIMENT

Now, an embodiment of the method of constructing and recording a list of recorded data in a postscript type optical disk will be described in detail with reference to the accompanying drawings.

First the construction of a disk recording/reproducing apparatus and a system controller thereof for realizing the method of constructing and recording a list of recorded data according to the present invention will be described with reference to FIGS. 1 and 2.

Figure 1:
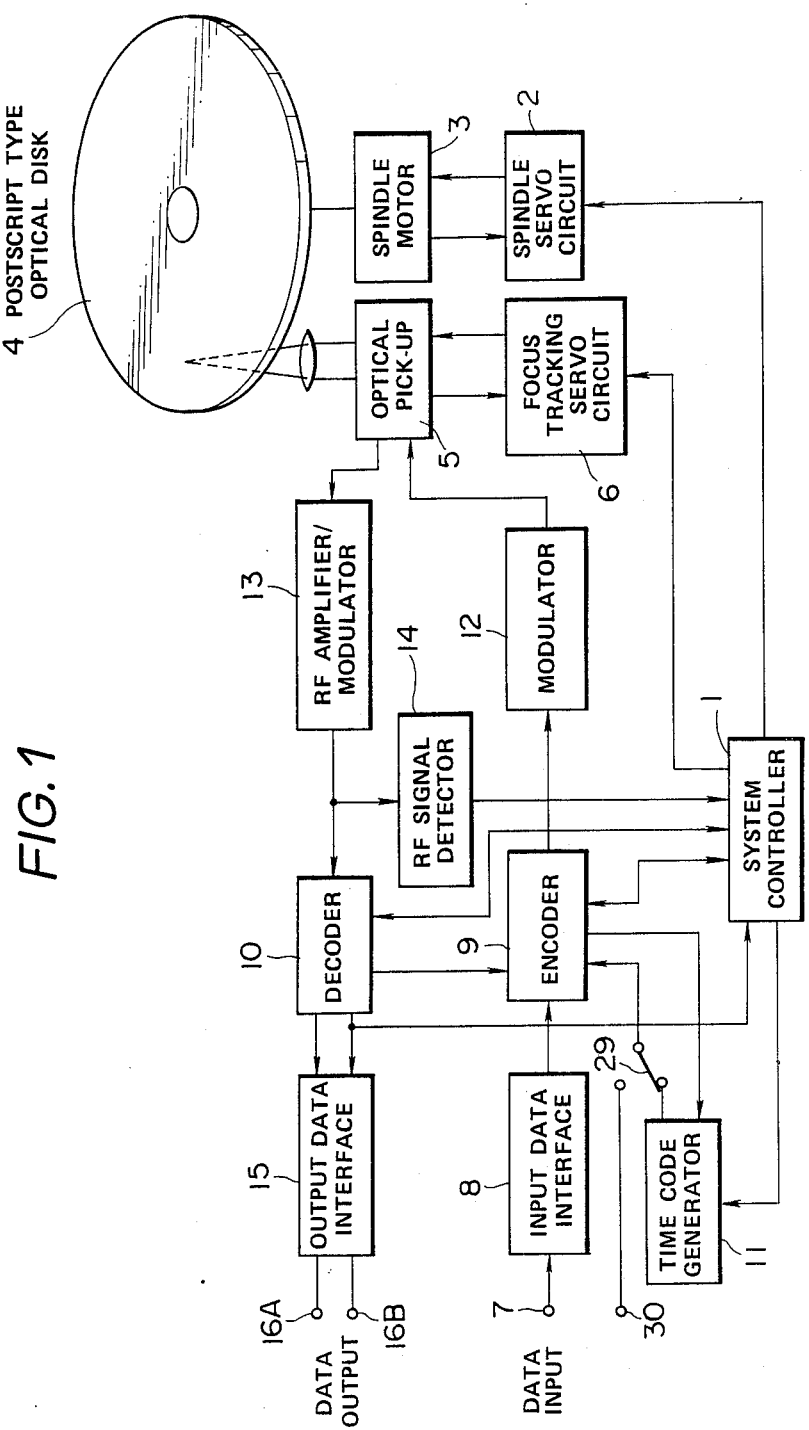
FIG. 1 is a block diagram showing a disk recording/reproducing apparatus according to the present invention.
Figure 2:
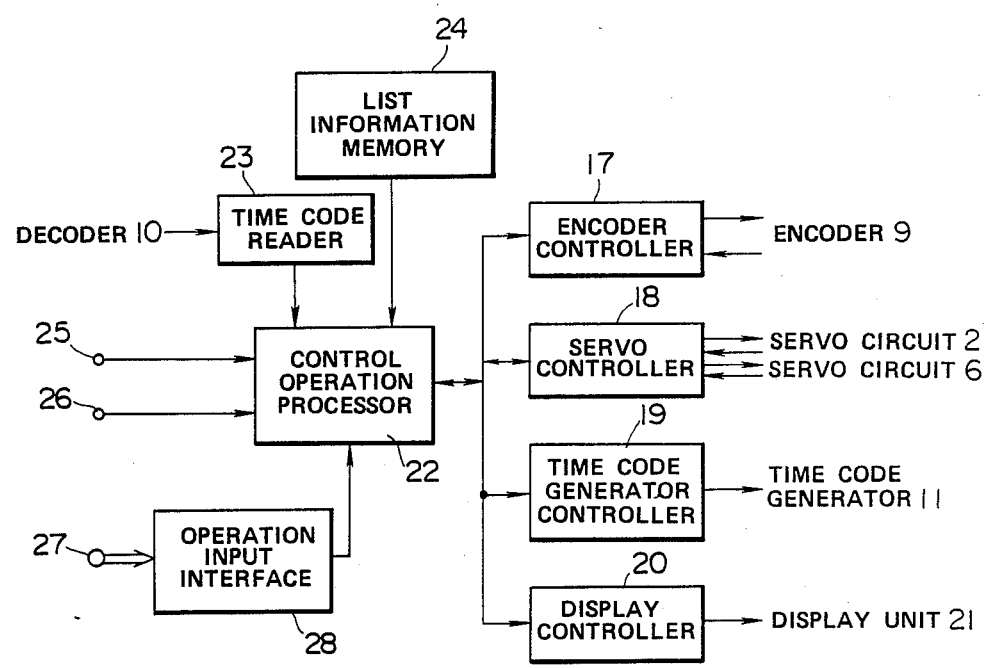
FIG. 2 is a block diagram showing a system controller of the disk recording/reproducing apparatus.

Referring to FIG. 1, a system controller 1 controls a spindle servo circuit 2, which in turn controls a spindle motor 3, whereby a postscript type optical disk 4 which is incapable of erasing is driven for rotation at a constant linear velocity. An optical pick-up 5 effects writing and reading of data with respect to the disk 4, and it is controlled by a focus tracking servo circuit 6 such that a laser beam is correctly focused on the recording surface of the disk. The servo circuit 6 is under control of the system controller 1. The system controller 1 may be a CPU "LH-0080" (a trade name by Sharp Co., Ltd.), a ROM "MBM 27128-25" (a trade name by Fujitsu Co., Ltd.), a RAM "MSM 5128-12RS" (a trade name by Oki Denki Kogyo Co., Ltd.) or an IPO "$\mu$PD71055C" (a trade name by Nippon Denki Co., Ltd.).

Input data to an input terminal 7 is fed through an input data interface 8 to an encoder 9. The encoder 9 converts the input data into one in a predetermined recording format. It may consist of an IC "CXD-1005Q, CXD-1006Q" (a trade name by Sony Co., Ltd.). The encoder 9 receives a reproduction sync signal supplied from a decoder 10 (consisting of IC "CX-7934, CX-7935" (trade names by Sony Co., Ltd.) and also receives a control signal supplied from the system controller 1. To the encoder 9 is supplied through a switch 29 time code data which is recorded together with input data from a time code generator 11 under control of the system controller 1. Externally supplied time code data to a terminal 30 is selectively supplied through the switch 29 to the encoder 9. The encoded output from the encoder 9 is supplied through a modulator 12 to the optical pick-up 5. A laser beam is light intensity modulated by the encoded output to obtain data recorded onto the disk 4.

When data recorded onto the disk 4 is reproduced, data which is read out by the optical pick-up 5 with the light intensity of the laser beam reduced compared to the value at the time of the recording, the read-out data being supplied to a RF amplifier/modulator 13. The RF amplifier/modulator 13 may be those used for current compact disk players. For example, an IC "CX-20109" (a trade name by Sony Co., Ltd.) is used for RF amplification, and an IC "CX-20109" (a trade name by Sony Co., Ltd.) is used as a demodulator. Data having been amplified by the RF amplifier/modulator 13 and demodulated to a predetermined pulse series (demodulated pulse series) is supplied to a RF detector 14, which detects the presence or absence of demodulation output) and also supplied to the decoder 10 under control of the system controller 1.

The decoder 10 processes the demodulated pulse series for separation of the sync signals and demodulation of data. The decoded output of the decoder 10 is divided into the reproduced data and time code data to be taken out as output data through an output data interface 15 and terminals 16A and 16B. The time code data from the decoder 10 is fed to the system controller 1.

Now, the construction of the system controller 1 will be explained with reference to FIG. 2. An encoder controller 17 supplies an on-off signal, i.e., synchronization permission signal to the encoder 9 and receives a status signal or a timing signal from the encoder 9. Further, a servo controller 18 suppplies a control signal to the servo circuits 2 and 6 and receives status signals from the servo circuits 2 and 6. Further, a time code generator controller 19 supplies new time code setting data (i.e., present data or operation command signals) to the time code generator 11. A display controller 20 supplies a display control signal to a display unit 21, which displays the prevailing performance time or status of apparatus. The controllers 17 to 20 receive a series of control by a control operation processor 22.

Time code data in the reproduced output is supplied from the decoder 10 to a time code reader 23. The output of the reader 23 is processed in the control operation processor 22.

List information, which is produced in the processor 22 on the basis of the time code data noted above, is stored in a list information memory 24. Also, the list information is read out for reference when it is necessary.

To a terminal 26 is supplied a disk detection signal, which is obtained from a disk detector (not shown) disposed on near a disk mounting position, consisting of a photodiode and a photodetector and representing the presence or absence of the disk 4 mounted in the apparatus. This disk detection signal is supplied to the processor 22. To the terminal 26 is also supplied a RF detection signal from the RF detector 14. The RF detection signal represents the presence or absence of a reproduced RF signal from the disk 4, and it is supplied to the processor 22. Further, when an operation switch (not shown) is operated, an operation input signal is supplied to a terminal 27 and hence through an operation input interface 28 to the processor 22.

Figure 3:
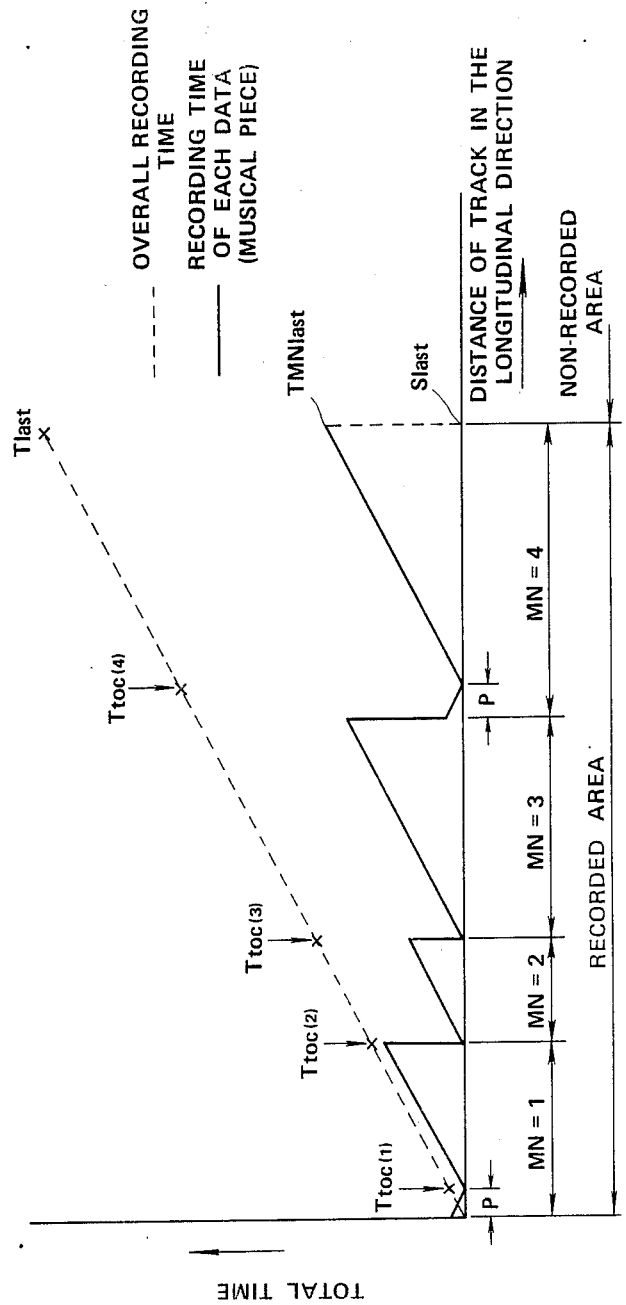
FIG. 3 is a diagram showing a record format of data recorded onto a disk by the disk recording/reproducing apparatus.

FIG. 3 shows a format of data recorded onto the disk 4 by the disk recording/reproducing apparatus having the above construction. This format is the same as the CD recording format noted above. In the embodiment shown in FIG. 3, four data (musical pieces), for instance, have been recorded onto record areas of the disk 4, and non-record areas succeeds the record areas. In FIG. 3 the abscissa represents the distance of a point on the disk from the inner periphery thereof, i.e., the distance of the track in the longitudinal direction, and the ordinate represents the total time. MN represents the data (musical piece) number, P pose time, $T_{toc}$ point of starting the recording of each data (musical piece), and $T_{last}$ point of ending the recording. The dashed plot represents the overall recording time, and the solid plot represents the recording time of each data (musical piece).

The procedure of production of a list of recorded data recorded onto the disk 4 will now be described with reference to the flow chart of FIG. 4.

Figure 4:
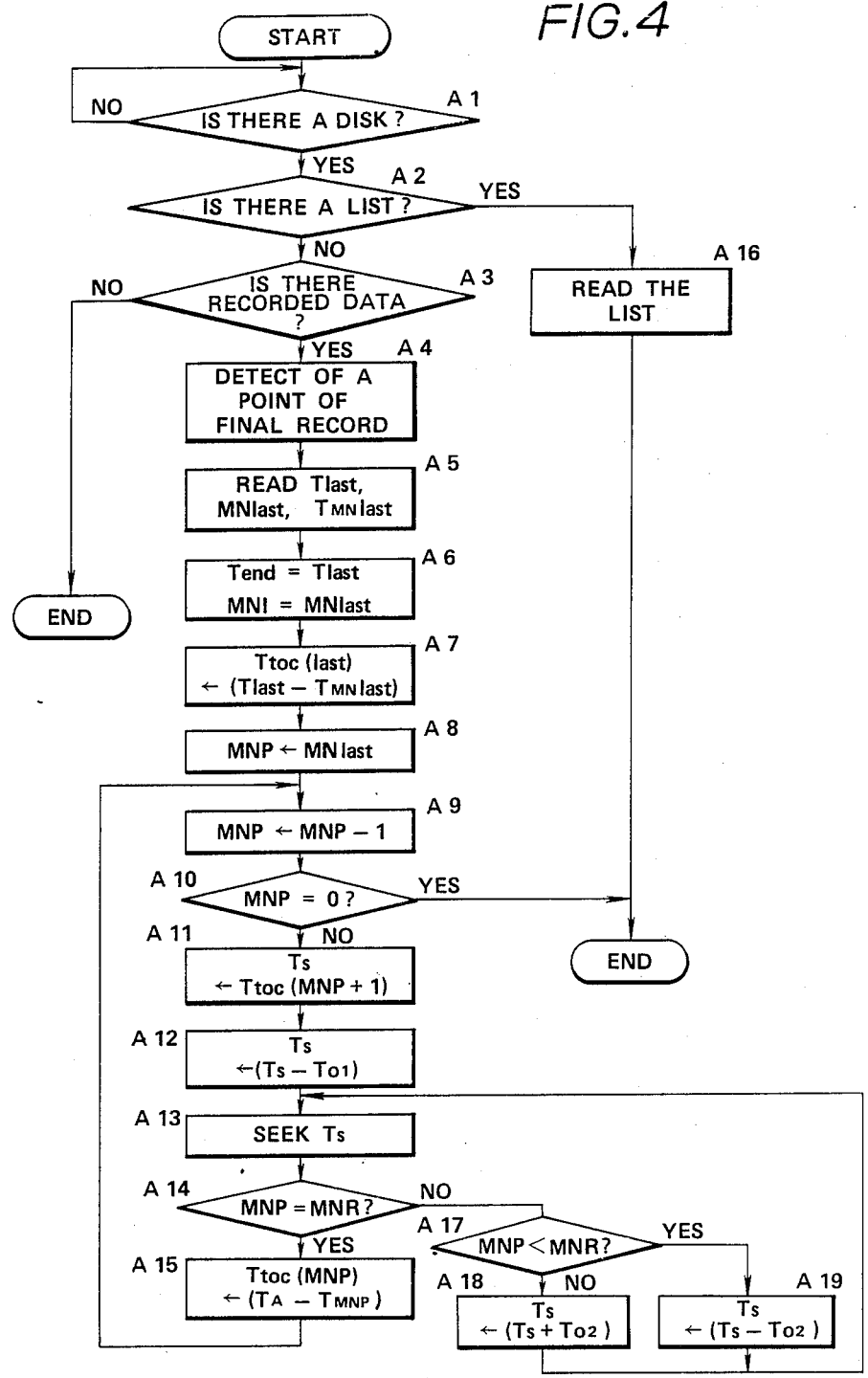
FIG. 4 is a flow chart showing a list construction procedure.

Referring to FIG. 4, in a step $A_1$, a check is done in the processor according to the detection output signal from the terminal 25 as to whether the disk 4 is mounted. If the disk 4 is not mounted, the routine goes via branch N. In this case, the apparatus is in a stand-by state. If the disk is mounted, the routine goes via branch F to a step $A_2$.

In the step $A_2$, the optical pick-up 5 is located at a position corresponding to the innermost list area of the disk 4 and starts reproduction of the list area on the disk 4 from this position. At this time, a check as to whether there is a list having been recorded onto the disk 4 is done in the processor 22 according to the detection signal of the reproduced RF signal by the RF detector 14 from the terminal 26. If it is found that there is a recorded list due to the RF detection signal in case when there is a reproduced RF signal, the routine goes via branch Y to a step $A_{16}$. If it is found that there is no recorded list due to the RF detection signal when there is no reproduced RF signal, the routine goes via branch N to a step $A_3$.

In the step $A_{16}$, the list recorded onto the disk 4 is read out, and the list information is stored in a time table on the list information memory 24. The routine then goes to a next step. In the step $A_3$, the optical pick-up 5 continuing the reproduction in the step $A_2$ jumps the list area and then reproduces record data. A check as to whether there is data having been recorded onto the disk 4 is then done in the processor 22 according to the RF detection signal from the terminal 26 representing the presence or absence of the reproduced RF signal. If there is recorded data, the routine goes via branch Y to the step $A_3$. If no data is recorded, the routine goes via branch N for processing with disk without record.

In the step $A_3$, the recorded data is sought within short periods of time by a method, for instance disclosed in GB-A-No. 2,101,356 filed by the present applicant, in which the point of ending the recording of recorded data (shown at $S_{last}$ in FIG. 3) with respect to the disk 4 in a direction crossing the tracks with relative movement of the optical pick-up 5. The detection of the point of ending the recording is done with reference to the detection signal of the reproduced RF signal supplied to the terminal 26. More specifically, the optical pick-up 5 is moved relative to the disk 4 to traverse one half of a distance L between the prevailing track scanned by the beam and the outermost track. Then, that track is reproduced, and if the reproduced RF signal is found, the optical pick-up is further moved by L/4 toward the outermost track. If no reproduced RF signal is found, the pick-up is moved by L/4 toward the innermost track. Then the pertinent track is reproduced, and if the reproduced RF signal is found, the pick-up is moved by L/8 toward the outermost track. If no reproduced RF signal is found, the pick-up is moved by L/8 toward the inner periphery. The above operation is repeated N (e.g., N=7) times to traverse a distance of $L/2^N$. If the reproduced RF signal is obtained from the pertinent track, the beam of the optical pick-up 5 is steered toward the outermost track. If no reproduced RF signal is obtained, the beam is steered toward the innermost track. In this way, a small extent tack jump, e.g., a traverse for 5 tracks, is done repeatedly. When a track with the reproduced RF signal is followed by a track without signal, one track is jumped from that track with signal toward the innermost track. This operation is done repeatedly, and the track with signal followed by a track without signal is regarded to be the point of ending the recording. When a track without signal if follwed by a track with signal, one track is jumped from that track without signal toward the outermost track. This operation is done repeatedly, and the track without signal followed by a track with signal is regarded to be the point of ending the recording. When the point of ending the recording is detected, the routine goes to a step $A_5$.

In the step $A_5$, time code data of the recorded data at the point of ending the recording, i.e., data representing the overall recording time $T_{last}$, last data (musical piece) number $MN_{last}$, and recording time $T_{MNlast}$ of the last data (musical piece), is read out after jumping of one track or two tracks from the point of ending the recording toward the innermost track. In this way, data is reliably read out. The routine then goes to a step $A_6$. In the step $A_6$, the time code data is supplied through the time code reader 23 to the processor 22. Further, a pose state is set up such that the beam of the optical pick-up 5 jumps one track or two tracks toward the innermost track when a tack with the reproduced RF signal is followed by a track without any such signal.

In the step $A_6$, the last data recording time $T_{last}$ is stored in an address $T_{end}$ of the time table (FIG. 5) on the memory 24, and the last data (musical piece) number $MN_{last}$ (in this example $MN_{last}=4$) is stored in an address $MN_L$. The routine then goes to a step $A_7$.

In the step $A_7$, the last data (musical piece) recording start time $T_{toc(last)}$ (in this example, $T_{toc(4)}$) is calculated in the processor 22 as $T_{last} - T_{MNtoc(Last)}$ and the result is stored in a corresponding address (in this example, the address of data number $MN_4$) of the time table. The routine then goes to a step $A_8$.

In the step $A_8$, a pointer MNP of the data (musical piece) number to be searched is initialized to $MN_{last}$ (i.e., $MNP = MN_{last}$), and then the routine goes to a step $A_9$.

In the step $A_9$, 1 is subtracted from MNP, and the pointer is advanced. The routine then goes to a step $A_{10}$.

In the step $A_{10}$, a check is done as to whether MNP = 0. If it is 0, the routine goes via branch Y, thus bringing an end to the operation of the time table production. If not, the routine goes via branch N to a step $A_{11}$.

In the step $A_{11}$, the contents of the data (musical piece) number time table with the MNP increased by 1, i.e., $T_{toc(MNP+1)}$, is stored in a register, in which is stored position information for shifting the optical pick-up 5 toward the inner periphery of the disk 4 (the position of the register being referred to as $T_S$) The routine then goes to a step $A_{12}$. The contents of the data (musical piece) number time table with the MNP increased by 1 are already known.

In the step $A_{12}$, an off-set time $T_{01}$ which is selected by taking the shortest data (musical piece) length or pose time into considerations is subtracted from $T_S$, and the resultant value is set as new $T_S$. That is, a process $T_S \leftarrow (T_S - T_{01})$ is performed. The routine then goes to a step $A_{13}$.

In the step $A_{13}$, the point of $T_S$ set in the step $A_{12}$ is sought. That is, the optical pick-up 5 is moved from the position of ending the recording at which it is in the pose after toward inner tracks on the disk 4 to a point of $T_S$ determined in the step $A_{12}$. This accessing is done using a method disclosed in GB-A-No. 2,127,176 filed by the applicant. The routine then goes to a step $A_{14}$.

In the step $A_{14}$, a check is done as to whether the data (musical piece) number MNR at the sought point is equal to the pointer MNP determined in the step $A_9$. If they are equal to each other, the routine goes via branch Y to a step $A_{15}$. If they are not equal, the routine goes via branch N to a step $A_{17}$. When the point of Ts is sought from $T_{last}$, for instance, with MNP=MNR in the first loop, the optical pick-up 5 enters the area of MN=3 in FIG. 3.

In the step $A_{15}$, the time code data at the sought point is read, and the time $T_{toc(MNP)}$ of starting the recording of the pertinent data (musical piece) number MNP is calculated from the overall recording time $T_A$ and recording time $T_{MNP}$ of the data (musical piece) number at that point. This process is expressed $$T_{toc(MNP)} \leftarrow (T_A - T_{MNP})$$

$T_{toc(MNP)}$ thus obtained is stored in the corresponding address area of the time table. Thereafter, the routine goes back to the step $A_9$, and the operation is repeated.

In the step $A_{17}$, the data (musical piece) number MNR at the sought point and pointer MNP are compared with each other. If it is found that MNP<MNR, that is, if it is determined that the next data (musical piece) number area has not yet been sought, the routine goes via branch Y to a step $A_{18}$. If MNP>MNR, it is determined that the next data (musical piece) number area is traversed, and the routine goes via branch N to a step $A_{19}$.

In the step $A_{18}$, an off-set time $T_{02}$ is added to $T_S$ showing the point to be sought to determine new $T_S$. This operation is expressed as $$T_S \leftarrow (T_S = T_{02})$$

Here, $T_{02} < T_{01}$. Then, the routine goes back to the step $A_{13}$.

In the step $A_{19}$, the off-set time $T_{02}$ is subtracted from $T_S$ showing the point to be sought to determine new $T_S$. This operation is expressed as $$T_S \leftarrow (T_S - T_{02})$$

Then, the routine goes back to the step $A_{13}$.

The sequence of operations in the above steps is performed in the control operation processor 22.

In the above process, a time table with list information is provided in the memory 24. In this instance, the time table is as shown in FIG. 5. In FIG. 5, MN represents the data (musical piece) number, and $MN_S$ represents the first data (musical piece) number.

In the above list preparation procedure, the point of ending the recording of recorded data on the disk 4 is detected, the point of starting the recording of that data (musical piece) is sought, and then the immediately preceding data area is sought, whereby the point of starting the recording of that data (musical piece) is obtained. In this way, the time table (list) of the recorded data can be produced within short periods of time in the memory 24.

With the non-erasable postscript type optical disk 4, it has been impossible to record a list in a list area of the disk 4 unless all data has been recorded. In the above list preparation procedure, on the other hand, it is possible to produce a list within short periods of time under control of the system controller 1, and it is possible to access the recorded data on the disk 4 with reference to list information read out from the memory 24.

In the mean time, the recorded data can be read out even during the process of searching the point of ending the recording in the step $A_4$ of the list preparation routine described above, and it is possible to reduce the number of cycles of the subsequent time-consuming seeking operation by obtaining the point of starting the recording of the recorded data read out at that time and storing it in the pertinent time table address. In this way, it is possible to reduce the list preparation time.

Further, the recorded data may be read out even during the seeking operation in the step $A_{13}$, and if the read-out data (musical piece) number coincides with the pointer MNP even before perfect reaching of the point $T_S$, the seeking operation may be ended by obtaining the point of starting the recording of data shown by the pointer MNP. Further, even in case when the read-out data (musical piece) number is not coincident with the pointer MNP, unless there is no pertinent time table, the process time can be reduced by storing the obtained point of starting the recording of the data (musical piece) number in the time table.

When additionally recording new data onto the disk 4 after preparation of the time table, a new time table may be added to the memory 24.

Further, when recording a list in a list area of the disk 4 after end of recording of data on the disk 4, list information is read out from the time table on the memory 24, and the list is recorded onto the disk 4 in a predetermined formula as shown, for instance, in FIG. 6. In FIG. 6, MN represents the data (musical piece) number, $MN_S$ the first data (musical piece) number and $MN_1$ the last data (musical piece) number.

Now, the operation of recording data onto the disk 4 in the disk recording/reproducing apparatus will be described.

Figure 7:
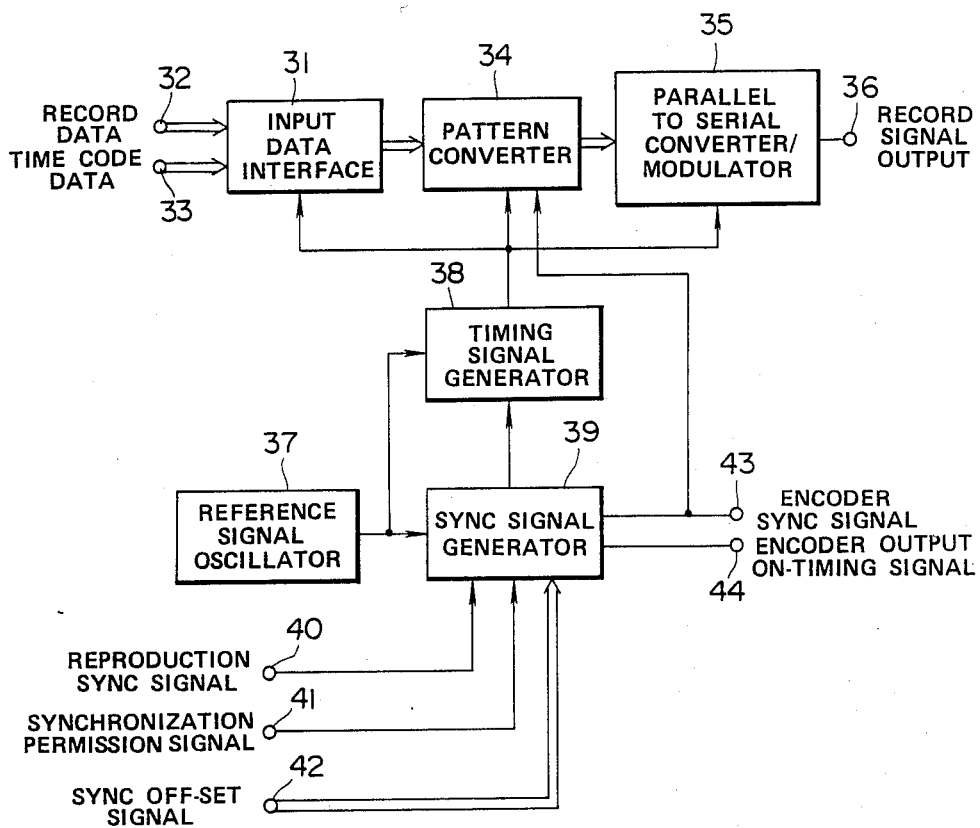
FIG. 7 is a block diagram showing an encoder in the disk recording/reproducing apparatus.

FIG. 7 is a block diagram showing the inner construction of the encoder 9. Referring to FIG. 7, data provided from the interface 8 is supplied to an input data interface 31 through a terminal 32, and time code data is supplied from the time code generator 11 through a terminal 34. The interface 31 temporarily stores the input data and also performs exchange of time code data and recorded data. The output of the interface 31 is supplied to a pattern converter 34 for converting data into a predetermined pattern suited for recording. The output of the converter 34 is processed in a parallel-to-serial converter/modulator 35, which performs parallel-to-serial conversion and modulation of data, and the output of which is supplied to the modulator 12 through a terminal 36. The output of a reference signal oscillator 37, which generates a master clock for determining the operation of each block, is supplied to a timing signal generator 38 and a sync signal generator 39. To the sync signal generator 39 are fed a reproduction sync signal (C in FIG. 8) from the decoder 10 through a terminal 40 and a synchronization permission signal (D in FIG. 8) from the system controller 1 through a terminal 41. To the sync signal generator 39 is further supplied through a terminal 42 a sync off-set signal for compensating for a delay time from an instant of the reading of recorded data [$D_a$] (See A in FIG. 8) on the disk 4 by the optical pick-up 5 till the establishment of the reproduced decode signal (B in FIG. 8) of the decoder 10. The sync signal generator 39 also performs compensation for the time delay in the data processing in the encoder 9. An encoder sync signal (E in FIG. 8) from the sync signal generator 39 is obtained through a terminal 43 and supplied to the time code generator 11 and other components. An encoder output on-timing signal (F in FIG. 8) obtained through a terminal 44 is supplied to the system controller 1. The output of the signal generator 39 is supplied to the timing signal generator 38 for generating various timing signals for internal operations. The signal generator 38 supplies timing signals thereof to the interface 31, converter 34 and parallel-to-serial converter/modulator 35 respectively. The sync signal from the sync signal generator 39 is also supplied to the pattern converter 34 for insertion of a sync pattern of data.

In the recording of data onto the disk 4, a check is first done by the system controller 1 as to whether there is data recorded onto the disk 4, on which to record the data. If the disk 4 is a non-recorded one, the optical pick-up 5 is moved to the first data recording area (on the inner periphery side) to start the recording of data under control of the timing signal from the encoder 9.

If data is recorded in all the recording areas of the disk 4, the recoridng operation is stopped.

If there is remaining recording areas so that additional recording of new data is possible although some data has been recorded (see FIG. 8), the additional recording of new data is done based on the following procedure.

The operation of the additional recording will be explained with reference to the time chart shown in FIG. 8.

First, the optical pick-up 5 is moved to the point of ending the recording of the recorded data, and the time code of the last record frame is read out to be stored under control of the system controller 1.

Then, the optical pick-up 5 is retracted toward the inner periphery of the disk by a number of frames necessary to ensure sufficient synchronization at the time of the additional recording (for instance, one track).

Figure 8:
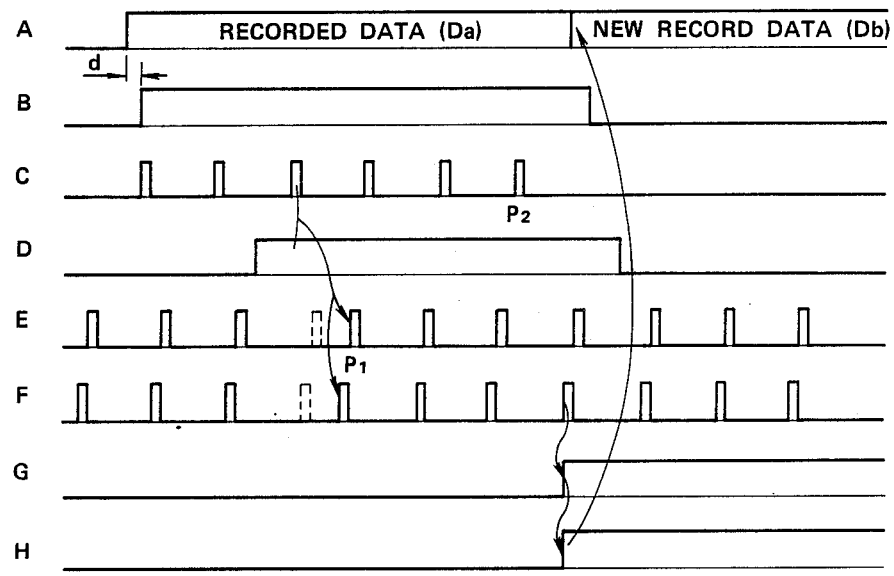
FIG. 8 is a time chart for explaining an additional recording with the disk recording/reproducing apparatus.

Then, an "on" synchronization permission signal as shown in D in FIG. 8 is provided to synchronize the encoder 9 to the reproduced sync signal (C in FIG. 8) from the decoder 10. This synchronization permission signal is supplied from the system controller 1 to the encoder 9. With this synchronization permission signal, the reproduced sync signal is synchronized to the internal operation timing of the encoder 9, and the encoder sync signal (E in FIG. 8) is synchronized to the reproduced sync signal. At the same time, the delay time d is compensated for according to the sync off-set signal. As a result, the encoder sync signal as shown in E in FIG. 8 is provided, which is synchronized to the reproduced sync signal from the point P₁ and is compensated for the delay time d.

Further, an encoder output on-timing signal in which the delay time in the signal processing in the encoder 9 has been compensated as shown in F in FIG. 8 is supplied from the encoder 9 to the system controller 1.

Further, the system controller 1, which is reading the time code data of the reproduced decoder signal (B in FIG. 8), executes a check, at the instant when time code data one frame before the time code data of the end-of-recording frame (point P₁ in C in FIG. 8), as to whether it is possible to record the data onto the disk 4.

If the system controller 1 judges at this time that the recording is possible, it starts recording operation (i.e., send out a command signal) with reference to the time code data from the decoder signal according to the timing signal from the encoder 9 (F, G in FIG. 8).

At this time, an encoder output "on" signal as shown in G in FIG. 8 is provided from the encoder 9 to the system controller 1. Also, a record signal (H in FIG. 8) is provided as the encoder output. Thus, the recording of data onto the disk 4 is started. The record signal is provided with a delay corresponding to the delay time in the encoder 9 as shown in H in FIG. 8.

Thus, the record signal is synchronized such that it is continuous with respect to data already recorded onto the disk 4. Thus, new record data [D$_b$] is recorded without any blank but right after the recorded data [D$_a$] as shown in A in FIG. 8.

As has been shown, in the disk recording/reproducing apparatus, the encoder 9 is synchronized to the reproduction sync signal of the decoder 10 and is also compensated for the delay time in the signal procebssing in the decoder 10 and encoder 9, thereby providing the encoder output "on" timing signal. Thus, it is possible to permit stable and continuous recording of the new record data [D$_b$] immediately after the already recorded data [D$_a$].

Therefore, there is no possibility of drop-out of data due to duplicate recording or non-continuous recording at the time of additional recording. In this way, it is possible to eliminate generation of error at the time of the reproduction and obtain highly dense recording.

Now, a description will be made of the operation of producing time code data of new record data continuous to time code data of recorded data when additionally recording the new record data together with the time code data immediately after the recorded data on the disk 4 with the disk recording/reproducing apparatus.

First, the inner construction of the time code data generator 11 for generating the time code data will be described with reference to the block diagram of FIG. 9.

Figure 9:
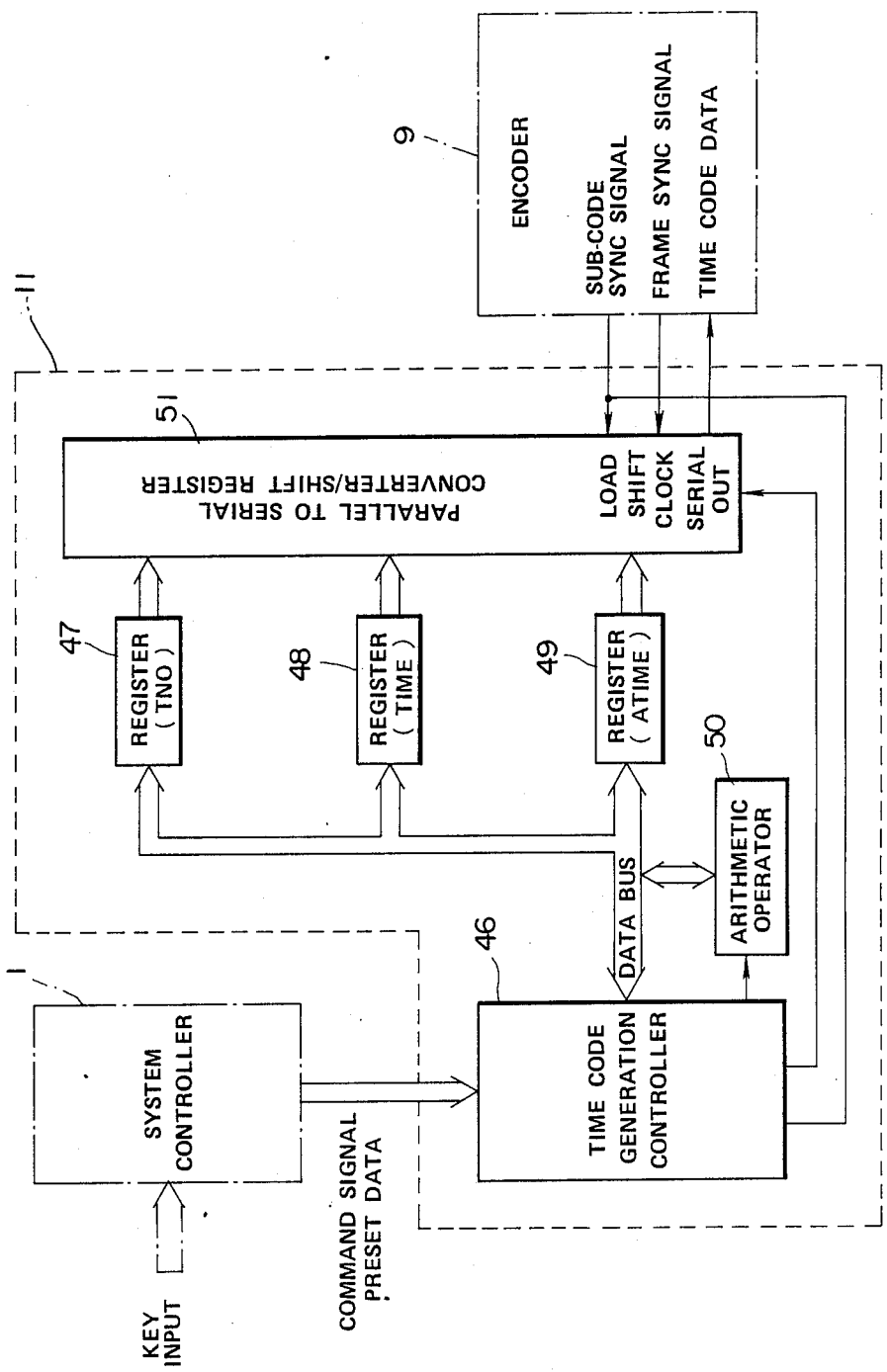
FIG. 9 is a block diagram showing a time code generator in the disk recording/reproducing apparatus.

Referring to FIG. 9, time code initial value preset data which is new time code setting data and operation command signals such as start and stop commands are supplied from the system controller 1 to a time code generation controller 46. To the system controller 1 are supplied key operation input signals obtained by operations of a start key, a stop key, a data (musical piece) number change key and an index key. The preset data consists of data (musical piece) number (TNO), overall recording time (TIME) of the data (musical piece) number and overall recording time (ATIME) from the point of starting the recording of data onto the disk.

To the controller 46 are connected first to third time code system code output registers 47 to 49, in which the time code data is temporarily stored. The registers 47 to 49 respectively store the data (musical piece) number (TNO), recording time (TIME) of the data (musical piece) number and overall recording time (ATIME). The data from the registers 47 to 49 are processed in an arithmetic operator 50 which is controlled for operation by an operation control signal from the controller 46. The data from the registers 47 to 49 are fetched in a parallel-to-serial converter/shift register 51, to which a sub-code sync signal is supplied as load signal from the encoder 9. With a frame sync signal supplied as shift clock from the encoder 9 to the shift register 51, time code data is supplied as serial data from the shift register 51 to the encoder 9. A control signal from the controller 46 is supplied to the shift register 51, and the sub-code sync signal is supplied to the controller 46.

Now, the explanation of the operation of recording the time code of the new record data will be described with reference to the flow chart of FIG. 10.

The system controller 1 causes the time code reader 23 to fetch time code data (TNOe, TIMEe, ATIMEe) at the point of ending the recording of the recorded data. Here, TNOe represents the data (musical piece) number at the point of ending the recording, TIMEe represents the recording time of the data (musical piece) number at the point of ending the recording and ATIMEe represents the overall recording time at the point of ending the recording. The control operation processor 22 in the system controller 1 produces the preset data from the time code data (TNOe, TIMEe and ATIMEe) as follows.

First, in case of additional recording by varying the data (musical piece) number (TNO), data (musical piece) number (TNO) of the preset data is set to TNOe+1. This operation is expressed as $$TNO \leftarrow TNOe+1$$

The recording time (TIME) of the data (musical piece) number at this time is set to zero, that is, $$TIME \leftarrow 0$$

The overall recording time (ATIME) at this time is set to ATIMEe+1, that is, $$ATIME \leftarrow ATIMEe+1$$

In case of additional recording without variation of the data (musical piece) number (TNO), the preset data are set as $$TNO \leftarrow TNOe$$

$$TIME \leftarrow TIMEe+1$$

$$ATIME \leftarrow ATIMEe+1$$

In case when recording is done onto the disk 4 without recorded data at all, the preset data are set as $$TNO \leftarrow 1$$

$$TIME \leftarrow 0$$

$$ATIME \leftarrow 0$$

The preset data as shown are supplied to the time code generation controller 46 of the time code generator 11 of the system controller 1.

Figure 10:
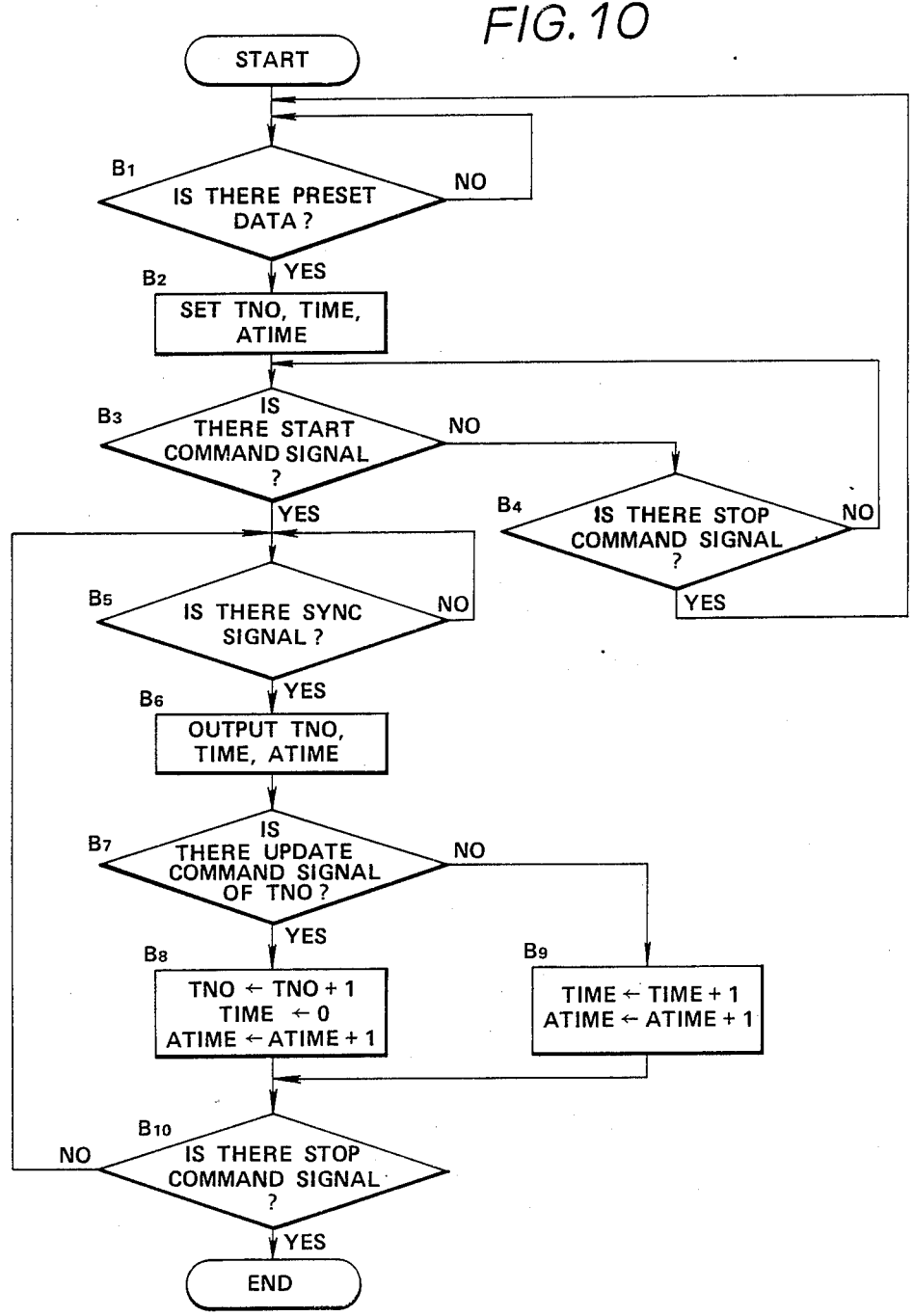
FIG. 10 is a flow chart for explaining the operation of the time code generator.

Then, in a step $B_1$ in FIG. 10, the controller 46 effects a check as to whether the preset data have been fed. If they have not been fed, the routine goes via branch N, bringing about the stand-by state. If the data have been fed, the routine goes through branch Y to a step $B_2$.

In the step $B_2$, the preset data (TNO, TIME and ATIME) fed to the controller 46 are set in the respective registers 47 to 49. The routine then goes to a step $B_3$.

In the step $B_3$, the controller 46 executes a check as to whether a start command signal has been fed by the controller 19 of the system controller 1. If the signal has not been fed, the routine goes via branch N to a step $B_4$. If the signal has been fed, the routine goes via branch Y to a step $B_5$.

In the step $B_4$, a check is done as to whether a stop/start command signal from the system controller 1 has been fed. If the signal has not been fed, the routine goes back to the step $B_3$. If the signal has been fed, the routine goes back to the step $B_1$.

In the step $B_5$, the controller 46 executes check as to whether a sub-code sync signal has been fed from the encoder 9 to the shift register 51. If the signal has not been fed, the routine goes via branch N, thus bringing about the stand-by state. If the signal has been fed, the routine goes via branch Y to a step $B_6$.

In the step $B_6$, the preset data (TNO, TIME and ATIME) loaded in the shift register 51 according to the sub-code sync signal is supplied as time code data suited to the time code recording format to the encoder 9 at the timing of the frame sync signal from the encoder 9. This time code data is recorded together with new record data additionally recorded immediately after the recorded data onto the disk 4 as time code data continuous to the time code data of the recorded data. Subsequently, the routine goes to a step $B_7$.

In the step $B_7$, a check is done as to whether an updating command signal for updating the data (musical piece) number (TNO) has been fed from the system controller 1 to the controller 46. If the signal has been fed, the routine goes via branch Y to a step $B_8$. If the signal has not been fed, the routine goes via branch N to a step $B_9$.

In the step $B_8$, the data in the registers 47 and 49 are fetched in the arithmetic operator 50 for operations of TNO+1 and ATIME+1, and new TNO and ATIME data are set in the registers 47 and 49. At this time, the data (TIME) is set to zero, and this data is set in the register 48 by the controller 46. The above operations are expressed as $$TNO \leftarrow TNO$$

$$TIME \leftarrow 0$$

$$ATIME \leftarrow ATIME+1$$

The routine subsequently goes to a step $B_{10}$.

In the step $B_9$, the arithmetic operator performs operations like the step $B_8$ noted above, and new data TIME and ATIME are set in the registers 47 and 49. At this time, the contents of the TNO data are unchanged. The operations are expressed as $$TIME \leftarrow TIME+1$$

$$ATIME \leftarrow ATIME+1$$

In the step $B_{10}$, the controller 46 executes a check as to whether a stop command signal has been fed from the system controller 1 to the controller 46. If the signal has not been fed, the routine goes back via branch N to the step $B_5$. If the signal has been fed, the routine goes via branch Y, thus bringing an end to the time code data output operation.

The arithmetic operator 50 also performs arithmetic operations on time code data in the pose time.

As has been shown, with the disk recording/reproducing apparatus at the time of additionally recording new record data immediately after recorded data it is possible to produce time code data suited to a time record format which is the same format as with the CD and effect additional recording of the new record data while maintaining the continuity of the data with the time code.

Thus, with the disk recording/reproducing apparatus capable of additional recording it is possible to record data in a plurality of recording operations on a single disk 4 and edit the source side data at the time of the recording. Further, since the time code data of the new recording data is suited to the time code recording format, it is possible to readily access data when reproducing the recorded data from the disk 4.

After new record data has been additionally recorded immediately after the recorded data while maintaining the continuity of the time code data, a list of recorded data is produced in the list preparation procedure as described above, and the obtained list information is stored in the time table shown in FIG. 5. In this way, the time table can be changed. Further, after all data has been additionally recorded onto the disk 4, the contents of the time table can be modulated into a predetermined digital signal, and the list of information can be recorded in a list area of the disk 4.

We claim:

1. In an optical disk recording/reproducing apparatus having means for seeking to a predetermined position on a postscript type optical disk, means for reading recorded data from said disk at said predetermined position, said recorded data comprising at least the data number of a datum recorded on said disk, and means for manifesting time code data corresponding to said predetermined position,
 a method of recording a time table, in a memory of said optical disk recording/reproducing apparatus, said time table composed of a list of recorded data stored on said optical disk, comprising the steps of:
 detecting a predetermined position on said optical disk corresponding to the ending position of all data recorded on said disk;
 reading time code data corresponding to said ending position;
 calculating the starting time of the last recorded datum on said disk by subtracting the recording duration time of said last recorded data from the time code data corresponding to the said ending position;
 storing said calculated time value in said time table at a position corresponding to the said data number of the last recorded datum on said disk;
 initializing a pointer with a value derived from said data number;
 reading out the starting time of the data number represented by said pointer from said time table;
 storing, in a register, a value equal to said calculated time value reduced by a predetermined offset;
 seeking the predetermined location on said disk corresponding to said value stored in said register;
 effecting compensation for the said value stored in said register when the data number of a datum recorded on said optical disk at the position corresponding to said stored value does not correspond with the value of said pointer, so as to obtain a stored value corresponding to the position of starting of the recorded datum on said optical disk corresponding to said pointer;
 storing said stored value in said time table at a location corresponding to the data number represented by the value of said pointer when the data number coincides with the pointer; and
 repeating said seeking operation to obtain the starting time point for each datum recorded on said optical disk so as to complete said list with starting times for all data recorded on said optical disk;
 and recording said list in a list area of said optical disk.

* * * * *